United States Patent [19]
Baldwin et al.

[11] Patent Number: 5,877,757
[45] Date of Patent: Mar. 2, 1999

[54] METHOD AND SYSTEM FOR PROVIDING USER HELP INFORMATION IN NETWORK APPLICATIONS

[75] Inventors: Wayne Ross Baldwin, Cedar Park; Athanasios George Gaitatzes, Austin, both of Tex.

[73] Assignee: International Business Machines Corporation, Armonk, N.Y.

[21] Appl. No.: 862,826

[22] Filed: May 23, 1997

[51] Int. Cl.$^6$ ......................................................... G06F 3/00
[52] U.S. Cl. ............................................ 345/336; 707/501
[58] Field of Search .................................... 345/336, 337, 345/338, 340–347; 707/501

[56] References Cited

U.S. PATENT DOCUMENTS

| | | | |
|---|---|---|---|
| 5,408,655 | 4/1995 | Oren et al. | 707/501 |
| 5,475,843 | 12/1995 | Halviatti et al. | 395/700 |
| 5,535,422 | 7/1996 | Chiang et al. | 345/338 |
| 5,539,886 | 7/1996 | Aldred et al. | 395/200.04 |
| 5,572,643 | 11/1996 | Judson | 395/793 |
| 5,630,125 | 5/1997 | Zellweger | 707/103 |

FOREIGN PATENT DOCUMENTS

| | | | |
|---|---|---|---|
| 0 747 840 A1 | 11/1996 | European Pat. Off. | G06F 17/30 |
| 0 747 843 A1 | 11/1996 | European Pat. Off. | G06F 17/30 |

OTHER PUBLICATIONS

Alan, F., "Lesson 94: . . . " LAN Magazine, v11, n6, p. 27(2), 1996.

Adler, m., "Adding Hypertext–based help to your application . . . ," Microsoft Systems Journal, v5, n3, p. 15(7), 1990.

Duncan, R., "Four ttechniques to enhance your windows help files, "PC Magazine, v12, n11, p. 359(3), 1993.

IBM Technical Disclosure Bulletin, vol. 39, No. 10, Oct. 1996, "Internet Image Statements".

IBM Technical Disclosure Bulletin, vol. 39, No. 11, Oct. 1996, "Internet Installation of Software Updates Using a Web Browser".

*Primary Examiner*—A. Katbab
*Attorney, Agent, or Firm*—Volel Emile; Andrew J. Dillon

[57] ABSTRACT

A method and system are disclosed for providing help-data in association with applications launched from a network, such that the applications are displayed within a window of a graphical user interface. Initially, an application is selected from among a number of applications, which are constructed from data generated at a server located within the network. Next, help-data associated with that application is identified. Thereafter, the identified help-data is automatically converted to hypertext data if the identified help-data is derived from a native format other than hypertext format. Hypertext links associated with the identified help-data are then automatically displayed within a window of the graphical user interface. Thereafter, the help-data is automatically displayed within a window of the graphical user interface as a hypertext document, in response to an invocation of the hypertext link by a user of the application. Thus, the hypertext links associated with the identified help-data can be presented to the user in the form of a table and in a graphical user interface window other than the graphical user interface window in which the application is displayed.

19 Claims, 8 Drawing Sheets

METHOD AND SYSTEM FOR PROVIDING USER HELP INFORMATION IN NETWORK APPLICATIONS

BACKGROUND OF THE INVENTION

1. Technical Field

The present invention relates to improved information-retrieval methods and systems. In particular, the present invention relates to data-processing systems which are linked to other data-processing systems by associated linking networks. More particularly, the present invention relates to an improved method and system for providing user help information that can be accessed efficiently by a user during a network-navigating session.

2. Description of the Related Art

The development of computerized information resources, such as the "Internet," allow users of data-processing systems to link with other servers and networks, and thus retrieve vast amounts of electronic information heretofore unavailable in an electronic medium. Such electronic information is increasingly displacing more conventional means of information transmission, such as newspapers, magazines, and even television.

In communications, a set of computer networks which are possibly dissimilar from one another are joined together by "gateways" that handle data transfer and the conversion of messages from the sending network to the protocols used by the receiving network, with packets if necessary. A gateway is a device used to connect dissimilar networks (i.e., networks utilizing different communication protocols) so that electronic information can be passed from one network to the other. Gateways transfer electronic information, converting such information to a form compatible with the protocols used by the second network for transport and delivery.

The term "Internet" is an abbreviation for "Internetwork," and refers commonly to the collection of networks and gateways that utilize the TCP/IP suite of protocols, which are well-known in the art of computer networking. TCP/IP is an acronym for "Transport Control Protocol/Interface Program," a software protocol developed by the Department of Defense for communication between computers. The Internet can be described as a system of geographically distributed computer networks interconnected by computers executing networking protocols that allow users to interact and share information over the networks. Because of such wide-spread information sharing, the Internet has thus far generally evolved into an "open" system for which developers can design software applications for performing specialized operations or services, essentially without restriction.

Electronic information transferred between data-processing networks is usually presented in hypertext, a metaphor for presenting information in a manner in which text, images, sounds, and actions become linked together in a complex non-sequential Web of associations that permit the user to "browse" or "navigate" through related topics, regardless of the presented order of the topics. These links are often established by both the author of a hypertext document and by the user, depending on the intent of the hypertext document. For example, traveling among links to the word "iron" in an article displayed within a graphical user interface in a data-processing system might lead the user to the periodic table of the chemical elements (i.e., linked by the word "iron"), or to a reference to the use of iron in weapons in Europe in the Dark Ages. The term "hypertext" was coined in the 1960s to describe documents, as presented by a computer, that express the nonlinear structure of ideas, as opposed to the linear format of books, film, and speech.

The term "hypermedia," on the other hand, more recently introduced, is nearly synonymous with "hypertext" but focuses on the nontextual components of hypertext, such as animation, recorded sound, and video. Hypermedia is the integration of graphics, sound, video, or any combination thereof into a primarily associative system of information storage and retrieval. Hypermedia, as well as hypertext, especially in an interactive format where choices are controlled by the user, is structured around the idea of offering a working and learning environment that parallels human thinking—that is, an environment that allows the user to make associations between topics rather than move sequentially from one to the next, as in an alphabetic list. Hypermedia, as well as hypertext topics, are thus linked in a manner that allows the user to jump from one subject to other related subjects during a search for information. Hyper-link information is contained within hypermedia and hypertext documents, which allow a user to move back to "original" or referring network sites by the mere "click" (i.e., with a mouse or other pointing device) of the hyper-linked topic.

A typical networked system that utilizes hypertext and hypermedia conventions follows a client/server architecture. The "client" is a member of a class or group that uses the services of another class or group to which it is not related. Thus, in computing, a client is a process (i.e., roughly a program or task) that requests a service provided by another program. The client process utilizes the requested service without having to "know" any working details about the other program or the service itself. In a client/server architecture, particularly a networked system, a client is usually a computer that accesses shared network resources provided by another computer (i.e., a server).

A request by a user for news can be sent by a client application program to a server. A server is typically a remote computer system accessible over the Internet or other communications medium. The server scans and searches for raw (e.g., unprocessed) information sources (e.g., newswire feeds or newsgroups). Based upon such requests by the user, the server presents filtered electronic information as server responses to the client process. The client process may be active in a first computer system, and the server process may be active in a second computer system, communicating with one another over a communications medium, thus providing distributed functionality and allowing multiple clients to take advantage of the information-gathering capabilities of the server.

Client and server communicate with one another utilizing the functionality provided by Hypertext-Transfer Protocol (HTTP). The World Wide Web (WWW) or, simply, the "Web," includes those servers adhering to this standard (i.e., HTTP) which are accessible to clients via a computer or data-processing system network address such as a Universal Resource Locator (URL). The network address can be referred to as a Universal Resource Locator address. For example, communication can be provided over a communications medium. In particular, the client and server may be coupled to one another via Serial Line Internet Protocol (SLIP) or TCP/IP connections for high-capacity communication. Active within the client is a first process, known as a "browser," which establishes the connection with the server and presents information to the user. The server itself executes corresponding server software which presents information to the client in the form of HTTP responses. The HTTP responses correspond to "Web pages" constructed from a Hypertext Markup Language (HTML), or other server-generated data. Each Web page can also be referred to simply as a "page."

The client and server typically display browsers and other Internet data for a user via a graphical user interface. A graphical user interface is a type of display format that enables a user to choose commands, start programs, and see lists of files and other options by pointing to pictorial representations (icons) and lists of menu items on the screen. Choices can be activated generally either with a keyboard or a mouse. Internet services are typically accessed by specifying a unique network address (i.e., Universal Resource Locator). The Universal Resource Locator address has two basic components, the protocol to be used and the object pathname. For example, the Universal Resource Locator address, "http://www.uspto.gov" (i.e., home page for the U.S. Patent and Trademark Office), specifies a hypertext-transfer protocol ("http") and a pathname of the server ("www.uspto.gov"). The server name is associated with a unique numeric value (TCP/IP address).

The evolution of personal computers over the last decade has accelerated the Web and Internet toward useful everyday applications. Nearly every computer sold over the last several years has or will, at some point, become "on-line" to an Internet service provider. Somewhere between 20 and 30 million people around the globe use some form of Internet service on a regular basis. The graphical portion of the World Wide Web itself is usually stocked with more than twenty-two million "pages" of content, with over one million new pages added every month.

Free or relatively inexpensive computer software applications such as Internet "search engines" make it simple to track down sites where an individual can obtain information on a topic of interest. A person may type in a subject or key word and generate a list of network sites (i.e., Web sites). Thus, with "home pages" published by thousands of companies, universities, government agencies, museums, and municipalities, the Internet can be an invaluable resource. With a little practice, even new users can skim millions of Web pages or thousands of newsgroups, not only for topics of general interest, but also to access precise bits of data. The market for Internet access and related applications is explosive and is growing faster than expected, doubling in size approximately every three months.

As the Internet expands daily, an increasing number of first-time users are entering the Internet via the World Wide Web. Most inexperienced users need some kind of assistance to utilize applications launched over the Internet. Most developers do provide help information with 30 their applications. However, such information cannot be easily or readily accessed by a user. Most developers place help information on a Web page in the form of links to other help pages, which makes the help information difficult for a user to utilize because of the necessity of continually "jumping" from page to page, particularly when an application launched over the Internet and the help information share the same page. When jumping from page to page, the original information is lost from view, and must be reloaded from cache memory when a previously accessed page is requested. Such constant jumping can frustrate the inexperienced user.

From the foregoing, it can be seen that a need exists for a method and system to provide help information readily and easily to a user in an efficient manner. A solution to the aforementioned problem would save an Internet user time and energy in downloading applications from the Internet that include help information. A method and system that allow a user the opportunity to utilize an application launched over the Internet and directly consult help information without navigating back and forth to different Web pages or network sites is a goal eagerly sought by World Wide Web page developers but which, thus far, has not been met in the prior art.

SUMMARY OF THE INVENTION

It is therefore an object of the invention to provide an improved information-retrieval method and system.

It is another object of the invention to provide an improved information-retrieval method and system that can be utilized with data-processing systems linked to other data-processing systems by associated linking networks.

It is still another object of the invention to provide an improved method and system in a data-processing network that allow help-data to be readily and efficiently accessed by a user during a network navigating session.

The above and other objects are achieved as is now described. A method and system are disclosed for providing help-data in association with applications launched from a network, such that the applications are displayed within a window of a graphical user interface. Initially, an application is selected from among a number of applications, which are constructed from data generated at a server located within the network. Next, help-data associated with that application is identified. Thereafter, the identified help-data is automatically converted to hypertext data, if the identified help-data is derived from a native format other than hypertext format. Hypertext links associated with the identified help-data are then automatically displayed within a window of the graphical user interface. Thereafter, the help-data is automatically displayed within a window of the graphical user interface as a hypertext document, in response to an invocation of the hypertext link by a user of the application. Thus, the hypertext links associated with the identified help-data can be presented to the user in the form of a table, and in a graphical user interface window other than the graphical user interface window in which the application is displayed.

BRIEF DESCRIPTION OF THE DRAWINGS

The novel features believed characteristic of the invention are set forth in the appended claims. The invention itself, however, as well as a preferred mode of use, further objects, and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
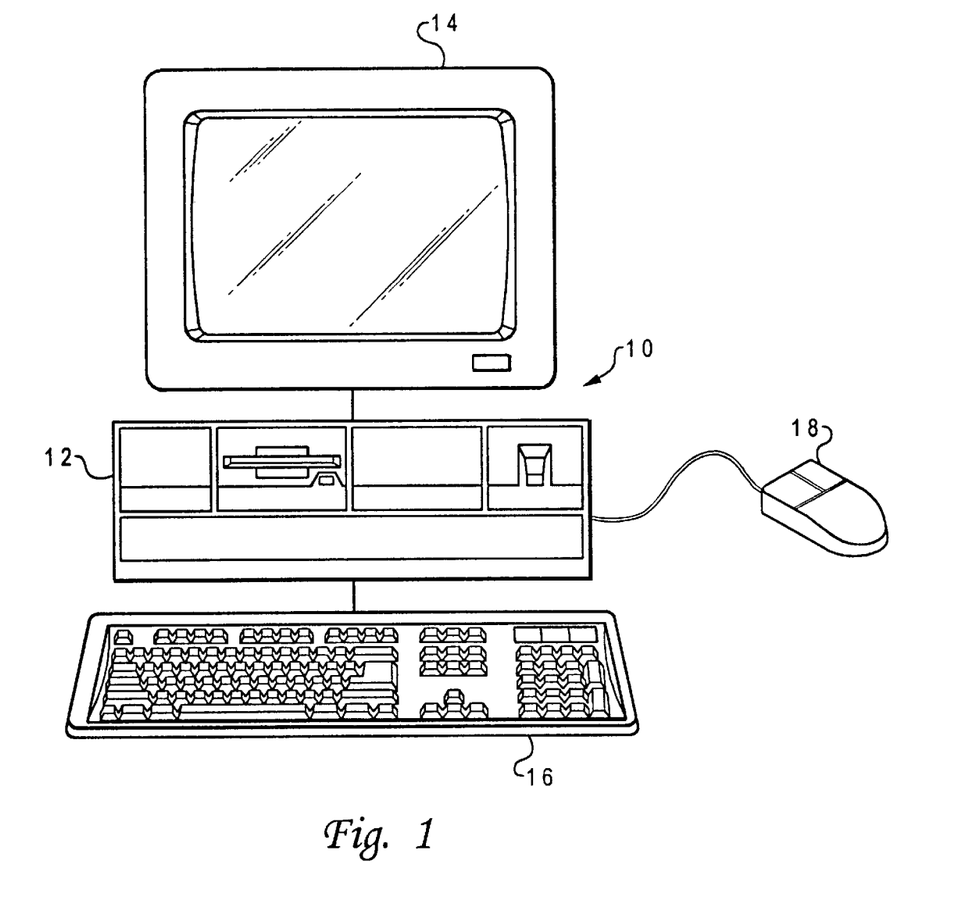
FIG. 1 is a pictorial representation of a data-processing system which can be utilized to implement the method and system of the present invention.

With reference now to the figures and, in particular, with reference to FIG. 1, there is depicted a pictorial representation of a data-processing system in which the present invention may be implemented in accordance with a preferred embodiment of the present invention. A personal computer 10 is depicted which includes a system unit 12, a video display terminal 14, an alphanumeric input device (i.e., keyboard 16) having alphanumeric and other keys, and a mouse 18. An additional input device (not shown), such as a trackball or stylus, also can be included with personal computer 10. Computer 10 can be implemented utilizing any suitable computer, such as an IBM Aptiva™ computer, a product of International Business Machines Corporation, located in Armonk, N.Y. "Aptiva" is a registered trademark of International Business Machines Corporation.

Although the depicted embodiment involves a personal computer, a preferred embodiment of the present invention may be implemented in other types of data-processing systems, such as, for example, intelligent workstations or mini-computers. Computer 10 also preferably includes a graphical user interface that resides within a machine-readable media to direct the operation of computer 10. Computer 10 also can be implemented utilizing any suitable computer, such as the IBM RISC/6000 computer, a product of International Business Machines Corporation, located in Armonk, N.Y. "RISC SYSTEM/6000" is a trademark of International Business Machines Corporation, and also can be referred to as the "RS/6000."

Figure 2:
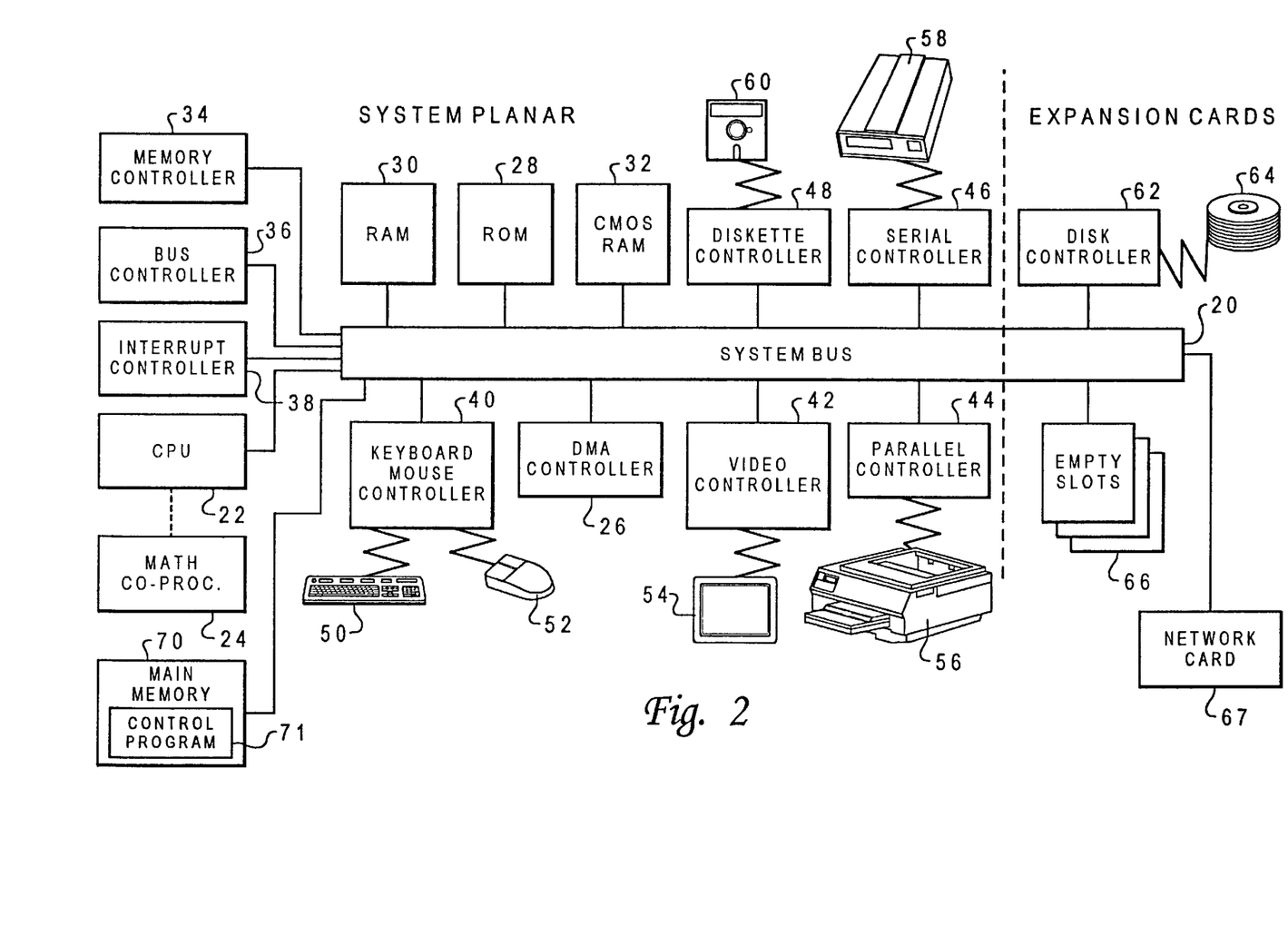
FIG. 2 depicts a block diagram illustrative of selected components in a personal computer system which can be utilized to implement the method and system of the present invention.

Referring now to FIG. 2 there is depicted a block diagram of selected components in personal computer 10 of FIG. 1 in which a preferred embodiment of the present invention may be implemented. Personal computer 10 of FIG. 1 preferably includes a system bus 20, as depicted in FIG. 2. System bus 20 is utilized for interconnecting and establishing communication between various components in personal computer 10. Microprocessor or central processing unit (CPU) 22 is connected to system bus 20 and also may have numeric co-processor 24 connected to it. Direct memory access ("DMA") controller 26 also is connected to system bus 20 and allows various devices to appropriate cycles from CPU 22 during large input/output ("I/O") transfers. Read-only memory ("ROM") 28 and random-access memory ("RAM") 30 are also connected to system bus 20. ROM 28 is mapped into the microprocessor 22 address space in the range from 640K to 1 megabyte. CMOS RAM 32 is attached to system bus 20 and contains system-configuration information. Any suitable machine-readable media may retain the graphical user interface of computer 10 of FIG. 1, such as RAM 30, ROM 28, a magnetic diskette, magnetic tape, or optical disk.

Also connected to system bus 20 are memory controller 34, bus controller 36, and interrupt controller 38 which serve to aid in the control of data flow through system bus 20 between various peripherals, adapters, and devices. System unit 12 of FIG. 1 also contains various I/O controllers, such as those depicted in FIG. 2: keyboard and mouse controller 40, video controller 42, parallel controller 44, serial controller 46, and diskette controller 48. Keyboard and mouse controller 40 provide a hardware interface for keyboard 50 and mouse 52. Video controller 42 provides a hardware interface for video display terminal 54. Parallel controller 44 provides a hardware interface for devices, such as printer 56. Serial controller 46 provides a hardware interface for devices, such as a modem 58. Diskette controller 48 provides a hardware interface for floppy-disk unit 60. Other technologies also can be utilized in conjunction with CPU 22, such as touch-screen technology or human voice control.

Main memory 70 is connected to system bus 20, and includes a control program 71. Control program 71 resides within main memory 70 and contains instructions that when executed on CPU 22 carry out the operations depicted in the logic flowchart of FIG. 7 described herein. The computer program product also can be referred to as a program product. Control program 71 can support a number of Internet-access tools including, for example, an HTTP-compliant Web "browser." Known browser software applications include: Netscape Navigator® ("Netscape"), Mosaic, and the like. Netscape, in particular, provides the functionality specified under HTTP. "Netscape" is a trademark of Netscape, Inc. Mosaic-brand browser is available from the National Center for Supercomputing Applications (NCSA) in Urbana-Champaign, Ill. The present invention is designed to operate with any of these known or developing Web browsers, in order to achieve the display of help information associated with applications launched from the Internet. Control program 71 also can support other Internet services, such as the file-transfer protocol (FTP) service, which facilitates the transfer and sharing of files across the Internet. Control program 71 can further support Internet services, such as remote terminal access (Telnet), which allows users to log onto computers coupled to the network. In addition, control program 71 additionally can support services, such as simple mail-transfer protocol (SMTP) or e-mail, and network news-transfer protocol (NNTP) or "Usenet," well-known in the art of computer networking.

It is important to note that, while the present invention has been (and will continue to be) described in the context of a fully functional computer system, those skilled in the art can appreciate that the present invention is capable of being distributed as a program product in a variety of forms and that the present invention applies equally regardless of the particular type of signal-bearing media utilized to actually carry out the distribution. Examples of signal-bearing media include: recordable-type media, such as floppy disks, hard-disk drives and CD ROMs, and transmission-type media, such as digital and analog communication links.

Expansion cards also may be added to system bus 20, such as disk controller 62, which provides a hardware interface for hard-disk unit 64. Empty slots 66 are provided so that other peripherals, adapters, and devices may be added to system unit 12 of FIG. 1. A network card 67 additionally can be connected to system bus 20 in order to link system unit 12 of FIG. 1 to other data-processing system networks in a client/server architecture or to groups of computers and associated devices which are connected by communications facilities. Those skilled in the art will appreciate that the hardware depicted in FIG. 2 may vary for specific applications. For example, other peripheral devices, such as: optical-disk media, audio adapters, or chip-programming devices, such as PAL or EPROM programming devices and the like also may be utilized in addition to or in place of the hardware already depicted. Note that any or all of the above components and associated hardware may be utilized in various embodiments. However, it can be appreciated that any configuration of the aforementioned system may be used for various purposes according to a particular implementation.

Figure 3:
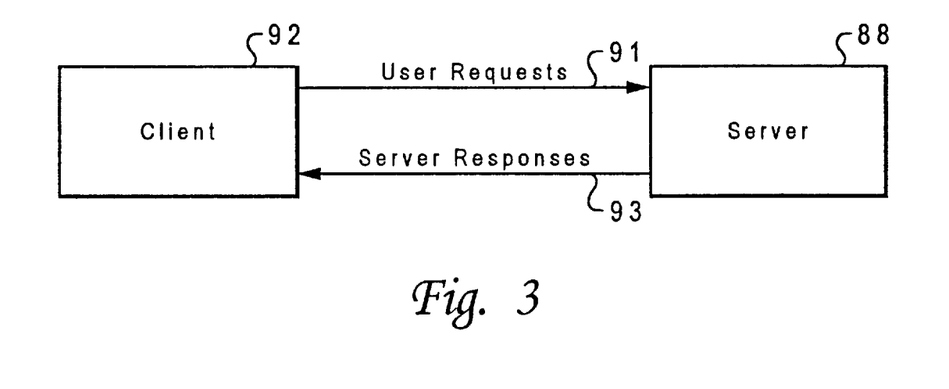
FIG. 3 illustrates a block diagram illustrative of a client/server architecture which can be utilized to implement the method and system of the present invention.
Figure 4:
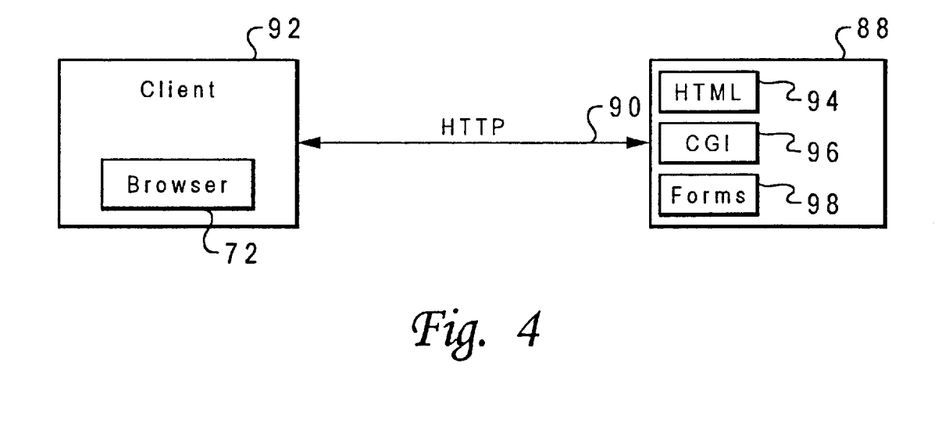
FIG. 4 depicts a detailed block diagram illustrative of a client/server architecture which can be utilized to implement the method and system of the present invention.
Figure 5:
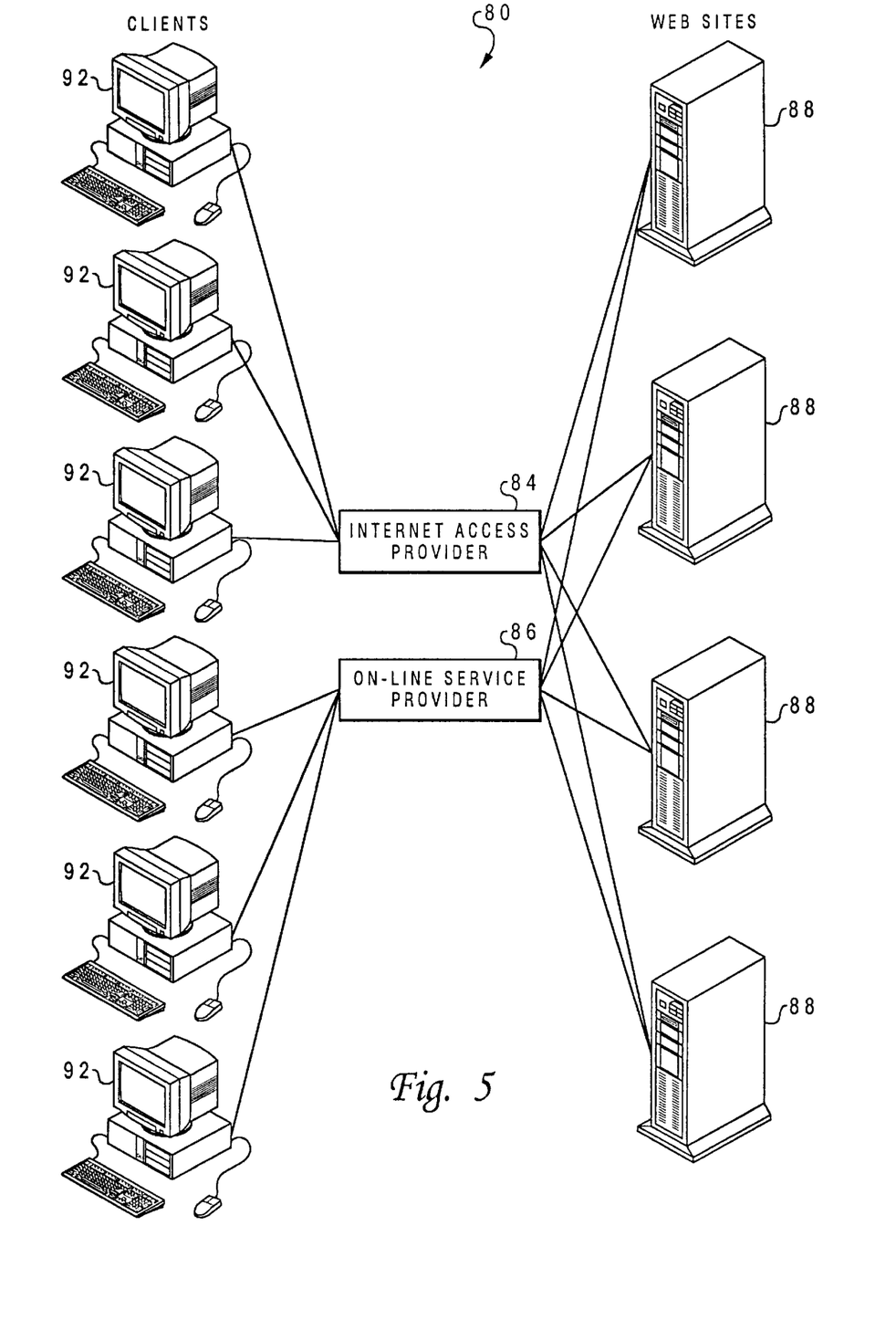
FIG. 5 is a diagram illustrative of a computer network which can be implemented in accordance with the method and system of the present invention.

In FIG. 3, FIG. 4, and FIG. 5, like parts are indicated by like numbers. FIG. 3 illustrates a block diagram illustrative of a client/server architecture which can be utilized in accordance with the method and system of the present invention. In FIG. 3, user requests 91 for news are sent by a client application program 92 to a server 88. Server 88 can be a remote computer system accessible over the Internet or other communications medium. Server 88 performs scanning and searching of raw (e.g., unprocessed) information sources (e.g., newswire feeds or newsgroups) and, based upon these user requests, presents the filtered electronic information as server responses 93 to the client process. The client process may be active in a first computer system, and the server process may be active in a second computer system and communicate with the first computer system over a communications medium, thus providing distributed functionality and allowing multiple clients to take advantage of the information-gathering capabilities of the server.

FIG. 4 illustrates a detailed block diagram of a client/server architecture which can be utilized in accordance with the method and system of the present invention. Although the client and server are processes which are operative within two computer systems, these processes being generated from a high-level programming language (e.g., PERL), which is interpreted and executed in a computer system at run-time (e.g., a workstation), it can be appreciated by one skilled in the art that they may be implemented in a variety of hardware devices, either programmed or dedicated.

Client 92 and server 88 communicate using the functionality provided by Hypertext-Transfer Protocol (HTTP). The term Web, as utilized herein, includes all servers adhering to the HTTP standard, which are accessible to clients via a Universal Resource Locator. Active within client 92 is a first process, browser 72, which establishes the connections with server 88, and presents information to the user. Any number of commercially or publicly available browsers may be used, in various implementations.

Server 88 executes the corresponding server software which presents information to the client in the form of HTTP responses 90. The HTTP responses 90 correspond with the Web pages represented using Hypertext Markup Language (HTML) or other data which is generated by the server. For example, under the Mosaic-brand browser, in addition to HTML functionality 94 provided by server 88 (i.e., display and retrieval of certain textual and other data based upon hypertext views and selection of item(s)), a Common Gateway Interlace (CGI) 96 is provided which allows the client program to direct server 88 to commence execution of a specified program contained within server 88. This may include a search engine which scans received information in the server for presentation to the user controlling the client. Using this interface, and HTTP responses 90, the server may notify the client of the results of that execution upon completion.

FIG. 5 is a diagram illustrative of a computer network 80 which can be implemented in accordance with the method and system of the present invention. Computer network 80 is representative of the Internet, a known computer network based on the client-server model discussed earlier. Conceptually, the Internet includes a large network of servers 88 which are accessible by clients 92, typically users of personal computers, through some private Internet-access provider 84 (e.g., such as Internet America) or an on-line service provider 86 (e.g., such as America On-Line, Prodigy, Compuserve, and the like). Each of the clients 92 may run a "browser," which is a known software tool used to access servers 88 via the access providers. Each server 88 operates a so-called Web site which supports files in the form of documents and pages. A network path to servers 88 is identified by a Universal Resource Locator having a known syntax for defining a network collection.

Figure 6:
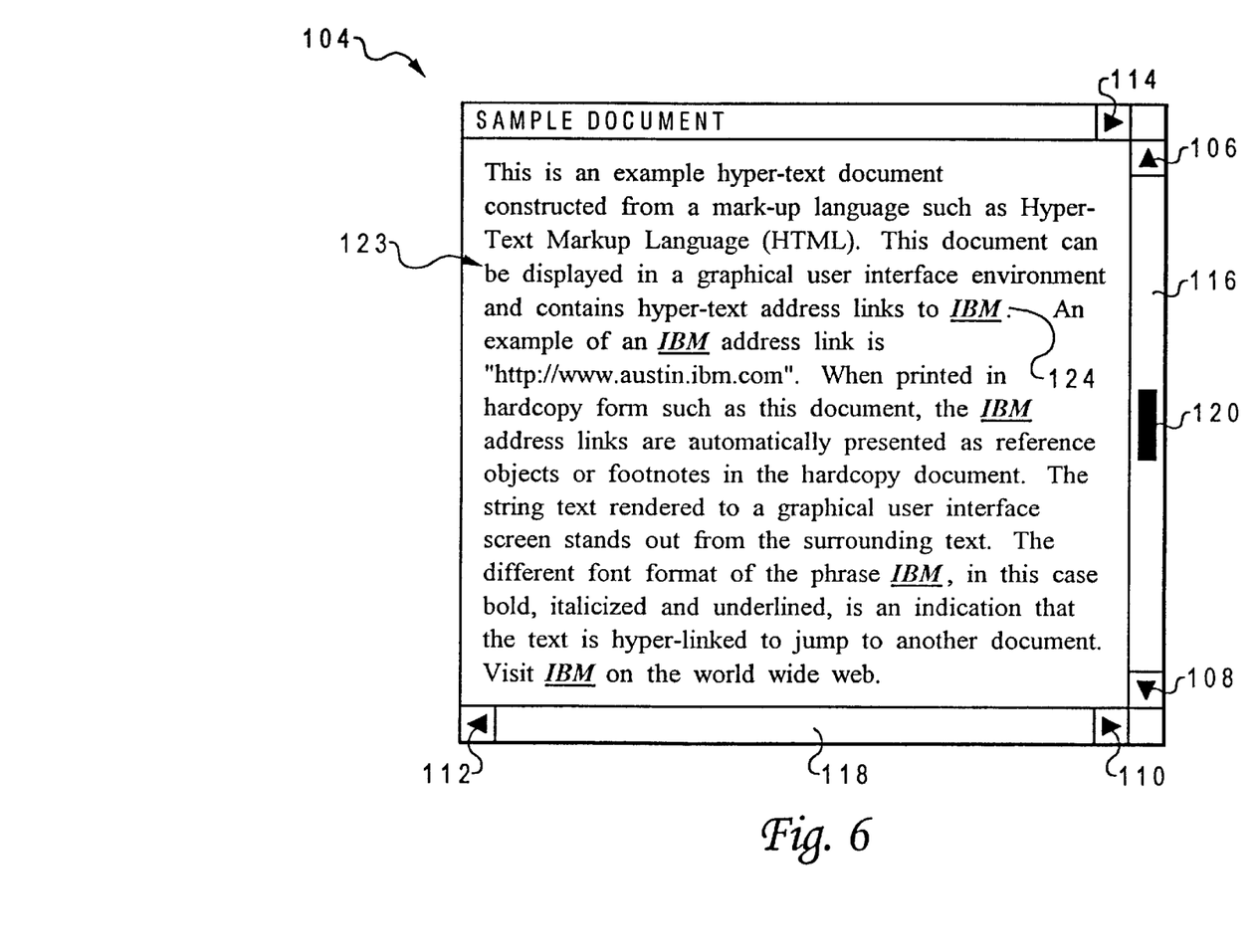
FIG. 6 illustrates a hypertext document contained within a graphical user interface window which can be utilized to implement the method and system of the present invention.

FIG. 6 illustrates an example hypertext document 123 contained within a graphical user interface window 104 which can be utilized in accordance with the method and system of the present invention. Window 104 displays a portion of a hypertext document 123 constructed from a mark-up language, such as Hypertext Mark-up Language (HTML). The size and position of elevator 120 within scroll bar 116 corresponds to the size and position of the current viewable page in relation to hypertext document 123. Hypertext document 123 can be accessed from a data-processing system contained within a data-processing network, such as the Internet.

In the example of FIG. 6, in view of the fact that hypertext document 123 includes too many pages to view simultaneously, the user can position a mouse cursor over up-arrow section 106 or arrow section 108 of scroll bar 116 and click a pointing device (e.g., a mouse) to scroll hypertext document 123 upward or downward, as appropriate. A vertical scroll bar 118 includes arrow sections 112 and arrow sections 110 for scrolling hypertext document 123 respectively left or right. Also, an optional arrow section 114 allows a user to scroll the document right. Thus, the graphical user interface that contains window 104 and hypertext document 123 is a type of computer display format that enables a user to choose commands, start programs, and see lists of files and other options by pointing to pictorial representations (i.e., icons) and lists of menu items on the screen. Choices can generally be activated either with a keyboard or a mouse.

Hypertext document 123 contains specific string text 124 rendered on the screen by the graphical user interface to stand out from the surrounding text. String text 124 is rendered in a different format. In the example of FIG. 6, string text 124 is rendered as IBM. The different font format of string text 124 is an indication that the text is hyper-linked to "jump" to another document. When a user clicks on string text 124 with a mouse or other pointing device, the graphical user interface shifts the presently viewed hypertext document 123 to another hyper-linked document.

Figure 7:
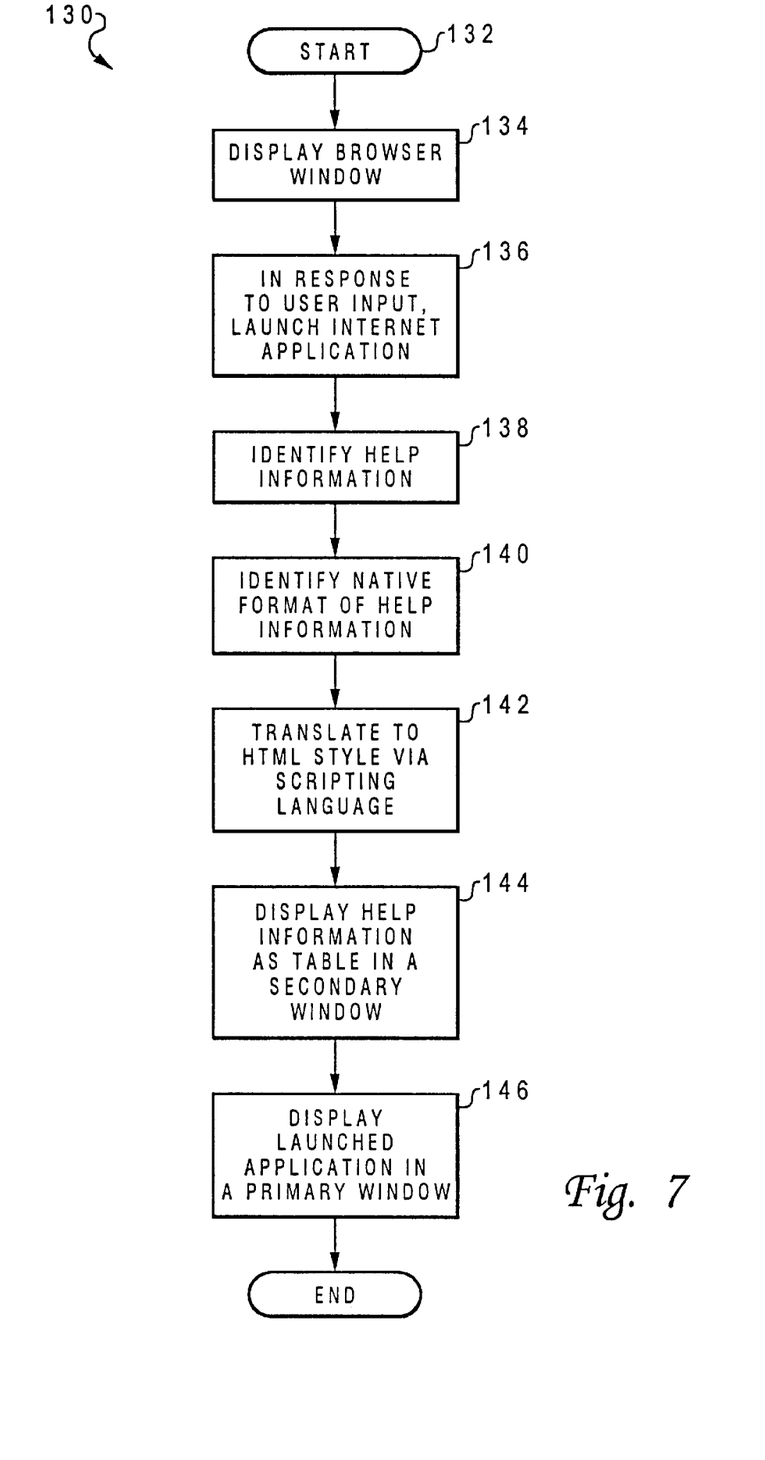
FIG. 7 depicts a flowchart of operations illustrating a method for providing help information for applications launched over a data-processing network in accordance with the method and system of the present invention.

FIG. 7 illustrates a flowchart of operations 130 illustrative of a method for providing help information for applications launched over a data-processing network in accordance with the method and system of the present invention. As depicted at block 134, a browser or navigator is loaded into a primary window of a graphical user interface. As illustrated at block 136, in response to user input, an application, such as a hypertext document, is launched from a Web site. The application can be launched when a user utilizes a pointing device, such as a mouse to "click" a hypertext link. As described at block 138, when the application is launched, help information contained with the application or referred by the application to other hyper-linked documents is identified. As illustrated at block 140, the native format (e.g., MAN pages on UNIX, HLP files on Windows, etc.) is identified. As depicted at block 142, the help information is translated from its native format via a scripting language and placed into an HTML-style Web page. Note that only a native format other than a hypertext format need be translated into an HTML-style Web page. If the native format of the application is already based on a hypertext format, such translation is unnecessary and the process proceeds as described herein.

As described at block 144, the help information is displayed as a table in a secondary window. A secondary window can be distinguished from a primary window. A primary window is a graphical user interface window in which the main interaction between a user and an object takes place. A primary window is utilized by a graphical user interface to present information independently from information in other windows. A secondary window supplements the interaction in the primary window upon which it is dependent. The table displayed within the secondary window can include, for example, a listing of help menu item topics and help-links to other Web pages. If a user desires to access a link to another Web page, the user can do so from within the secondary window. Thus, while the link is accessed via the secondary window, the information displayed within the primary window remains viewable to the user. Finally, as depicted at block 146, the launched application itself is displayed in the primary window.

Figure 8:
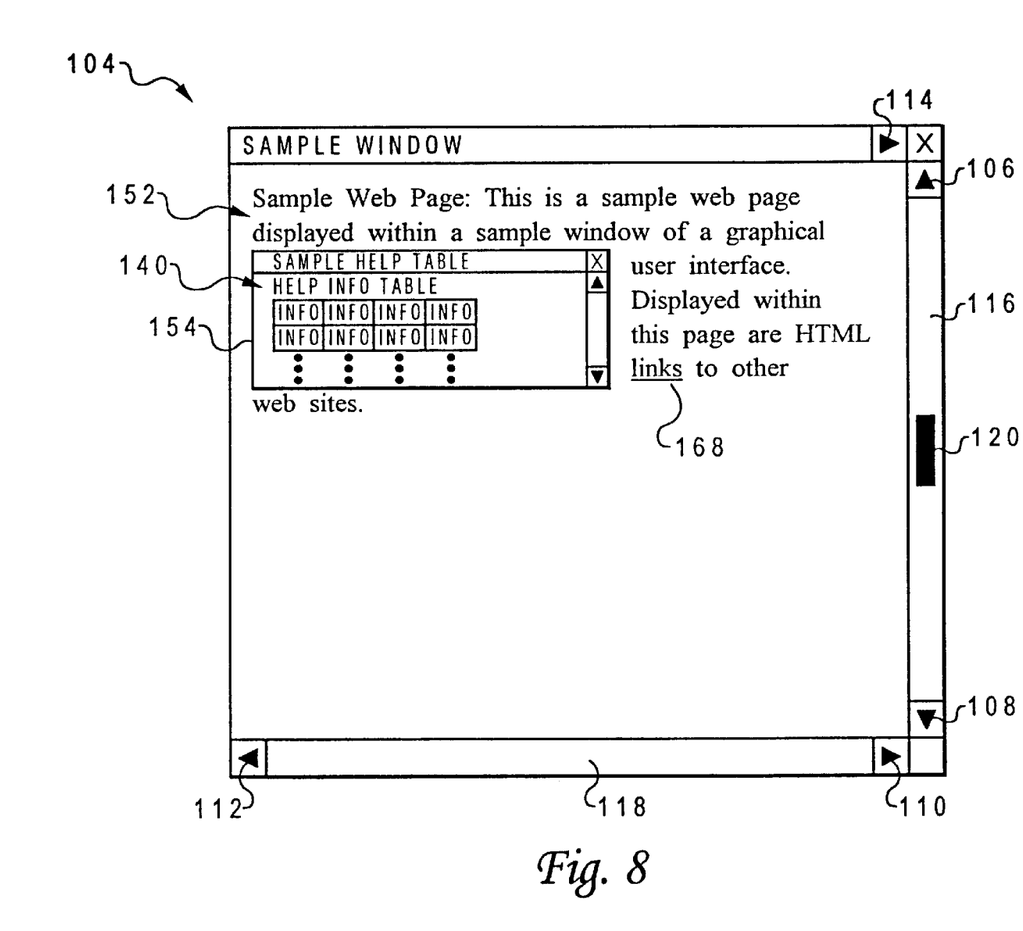
FIG. 8 illustrates a sample Web page and a help-information table displayed along with a graphical user interface window in accordance with the method and system of the present invention.

FIG. 8 illustrates a sample Web page 152 and a help-information table 140 displayed along with graphical user interface window 104 in accordance with the method and system of the present invention. Note that in FIG. 6, FIG. 8, and FIG. 9, like parts are indicated by like numbers. Sample Web page 152 is linked to other Web pages via an HTML link, such as link 168. A secondary window 154 is displayed within window 104. Help-information table 140, displayed within secondary window 154, includes a listing of help menu item topics and help-links to other Web pages. If a user desires to access a link to another Web page, the user can do so from within secondary window 154. When an application launched over the Internet is displayed as a Web page within a primary window, such as window 104, the help information accompanying the launched application in the form of files or links to other help Web pages is organized into the help-information table displayed within secondary window 154. Such an approach allows a user the opportunity to consult help information without going back and forth between Web pages displayed within window 104.

Figure 9:
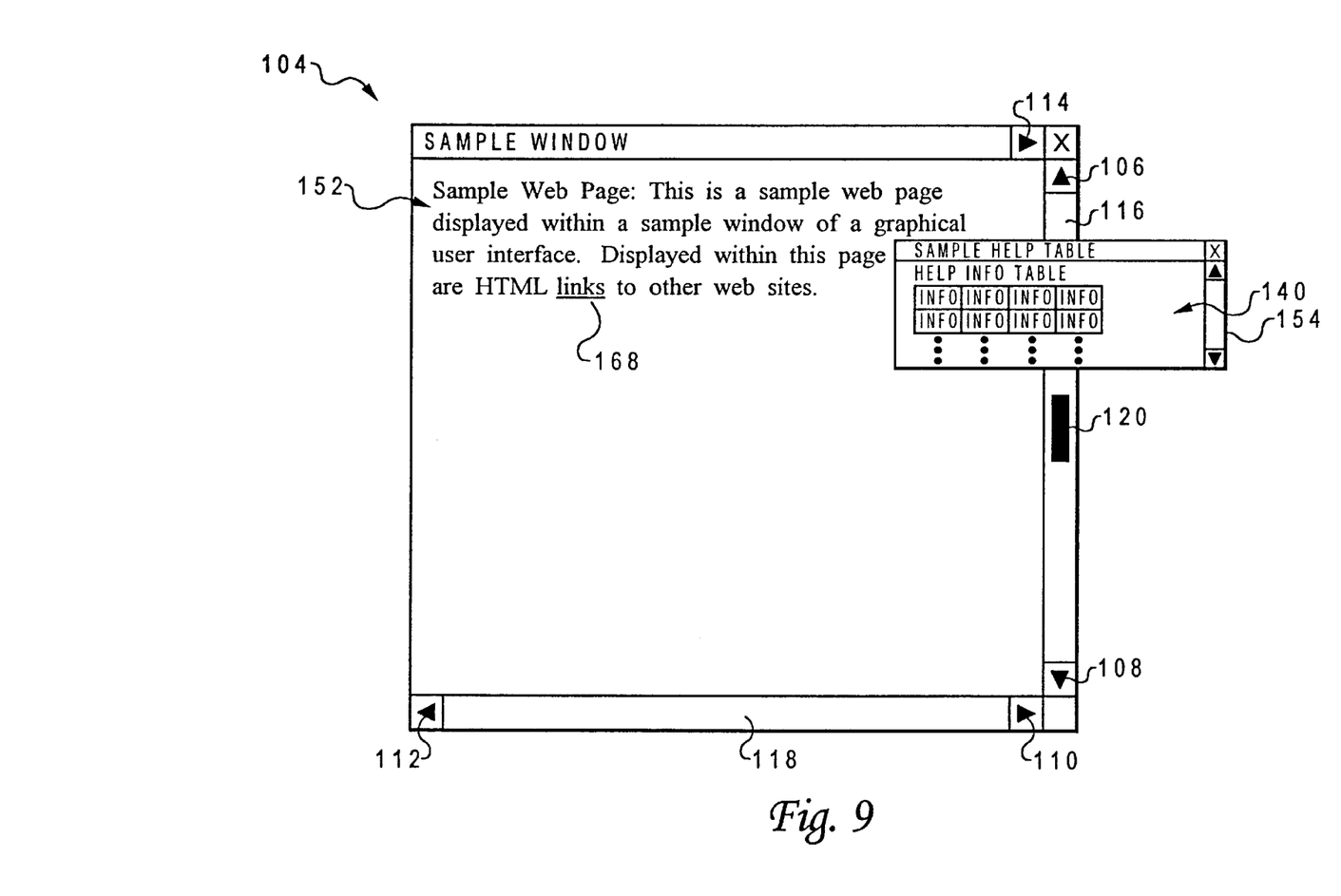
FIG. 9 illustrates an alternative embodiment illustrative of a sample Web page and a help-information table displayed along with a graphical user interface window in accordance with the method and system of the present invention.

FIG. 9 illustrates an alternative embodiment illustrative of a sample Web page 152 and a help-information table 140 displayed along with graphical user interface window 104 in accordance with the method and system of the present invention. Sample Web page 152 is displayed within a primary window 104. The help information is displayed within secondary window 154. The difference between the embodiment illustrated in FIG. 8 and the embodiment illustrated in FIG. 9 lies in the position of secondary window 154. Secondary window 154 can be displayed outside of a region that includes primary window 104. It is not necessary to display secondary window 154 solely within the region that includes sample Web page 152.

In the example of FIG. 9, a secondary window sits atop scroll bar 116. The secondary window also can be located in a region entirely beyond scroll bar 116 and primary window 104. Thus, help-information window (i.e., secondary window 154) is an additional feature that can be added to a given Web browser. The Web browser itself need not be modified. The help-information window, in accordance with the method and system of the present invention, can be added to a Web-browser application as a so-called "plug-in" or additional Web-browser feature.

The help-information table 140 displayed within secondary window 154, as shown in the example of FIG. 9, includes a number of hypertext links labeled "INFO." Hypertext link 168 is underlined to indicate that it is a hypertext link. However, it is not necessary to underline a hypertext link as long as it is clear to a user of the Web browser in which the hypertext link is displayed that the hypertext link is, in fact, a hypertext link. This can be accomplished by italicizing the hypertext link or displaying such links in capital letters. When a user utilizes a pointing device, such as a mouse to "click" on a hypertext link, such as "INFO," the hypertext document, when activated, will be displayed within secondary window 154. Secondary window 154 is a browser window. Although not shown in FIG. 9, a typical browser window can include icons that allow a user to return to a previous Web page from a currently displayed Web page. Thus, the user can return from the hypertext document associated with the link "INFO" to the original help-information table 140. In such a manner, a user can move back and forth between topics arranged by hypertext link within help-information table 140, while sample Web page 152 continues to run on its own within window 104.

Sample Web page 152 can be implemented with conventional HTML and enhancements thereto (including HTML 2.0, HTML 3.0, HTML with third party-supplied extensions, such as NHTML, and the like), by an HTML-compliant browser, such as Netscape, Mosaic, as such existing or developed programs are modified to include the functionality of the invention described above. Netscape has in-line support for platform-independent application objects (e.g., applets written in JavaScript, from Sun Microsystems). An applet resides on the server associated with a Web page, such as sample Web page 152, and is downloaded to the client browser after a link is established to the Web page. The browser includes an engine for executing the downloaded applets.

While the invention has been particularly shown as described with reference to a preferred embodiment, it will be understood by those skilled in the art that various changes in form and detail may be made therein without departing from the spirit and scope of the invention. For example, the present invention is applicable to other communication networks besides the Internet, including "intranets" (i.e., networks internal to particular organizations). It is therefore contemplated that such modifications can be made without departing from the spirit or scope of the present invention as defined in the appended claims.

What is claimed is:

1. A method for providing help-data in association with applications launched from a computer network, wherein said applications are displayed within a window of a graphic interface, and selected from among a plurality of applications, each of said plurality of applications constructed from data generated at a server located within said computer network, said method comprising the steps of:

identifying help-data associated with a selected application launched from said computer network;

automatically converting said identified help-data to hypertext data, if said identified help-data is derived from a native format other than hypertext format;

automatically displaying within a window of said graphic interface, at least one hypertext link associated with said identified help-data; and automatically displaying within a window of said graphic interface, said help-data as a hypertext document, in response to an invocation of said at least one hypertext link by a user of said selected application.

2. The method of claim 1 further comprising the step of:
if, in response to a user input, an additional application is launched from said computer network via said at least one hypertext link, automatically displaying said additional application within a window of said graphic interface.

3. The method of claim 2 wherein the step of if, in response to a user input, an additional application is launched from said computer network via said at least one hypertext link, automatically displaying said additional application within a window of said graphic interface, further comprises the step of:
if, in response to user input, an additional application is launched from said computer network via said at least one hypertext link, automatically displaying said additional application within a secondary window of said graphic interface.

4. The method of claim 2 wherein the step of automatically displaying within a window of said graphic interface, at least one hypertext link associated with said identified help-data, further comprises the step of:
automatically displaying in tabular form within a window of said graphic interface, at least one hypertext link associated with said identified help-data.

5. The method of claim 3 wherein the step of automatically displaying within a window of said graphic interface, at least one hypertext link associated with said identified help-data, further comprises the step of:
automatically displaying in tabular form within a window of said graphic interface, at least one hypertext link associated with said identified help-data.

6. A system for providing help-data in association with applications launched from a computer network, wherein said applications are displayed within a window of a graphic interface, and selected from among a plurality of applications, each of said plurality of applications constructed from data generated at a server located within said computer network, said system comprising:
identifying means for identifying help-data associated with a selected application launched from said computer network;
converting means for automatically converting said identified help-data to hypertext data, if said identified help-data is derived from a native format other than hypertext format;
first display means for automatically displaying within a window of said graphic interface, at least one hypertext link associated with said identified help-data; and
second display means for automatically displaying within a window of said graphic interface, said help-data as a hypertext document, in response to an invocation of said at least one hypertext link by a user of said selected application.

7. The system of claim 6 further comprising:
third display means for automatically displaying an additional application within a window of said graphic interface if, in response to a user input, said additional application is launched from said network via said at least one hypertext link.

8. The system of claim 7 wherein said third display means further comprises:
display means for automatically displaying an additional application within a secondary window of said graphic interface if, in response to a user input, said additional application is launched from said computer network via said at least one hypertext link.

9. The system of claim 7 wherein said first display means further comprises:
display means for automatically displaying in tabular form within a window of said graphic interface, at least one hypertext link associated with said identified help-data.

10. The system of claim 8 wherein said first display means further comprises:
display means for automatically displaying in tabular form within a window of said graphic interface, at least one hypertext link associated with said identified help-data.

11. A program product residing in computer memory in a computer for providing help-data in association with applications launched from a computer network, wherein said applications are displayed within a window of a graphic interface and selected from among a plurality of applications, each of said plurality of applications constructed from data generated at a server located within said computer network, said program product comprising:
identifying means for identifying help-data associated with a selected application launched from said computer network;
converting means for automatically converting said identified help-data to hypertext data, if said identified help-data is derived from a native format other than hypertext format;
first display means for automatically displaying within a window of said graphic interface, at least one hypertext link associated with said identified help-data;
second display means for automatically displaying within a window of said graphic interface, said help-data as a hypertext document, in response to an invocation of said at least one hypertext link by a user of said selected application; and
signal-bearing media bearing said selection means, said identifying means, said converting means, said first display means, and said second display means.

12. The system of claim 11 further comprising:
third display means for automatically displaying an additional application within a window of said graphic interface if, in response to a user input, said additional application is launched from said computer network via said at least one hypertext link.

13. The system of claim 12 wherein said third display means further comprises:
display means for automatically displaying an additional application within a secondary window of said graphic interface if, in response to a user input, said additional application is launched from said computer network via said at least one hypertext link.

14. The system of claim 12 wherein said first display means further comprises:
display means for automatically displaying in tabular form within a window of said graphic interface, at least one hypertext link associated with said identified help-data.

15. The system of claim 13 wherein said first display means further comprises:
display means for automatically displaying in tabular form within a window of said graphic interface, at least one hypertext link associated with said identified help-data.

16. The program product of claim 14 wherein:

said signal-bearing media further comprises recordable media.

17. The program product of claim 14 wherein:

said signal-bearing media further comprises transmission media.

18. The program product of claim 15 wherein:

said signal-bearing media further comprises recordable media.

19. The program product of claim 15 wherein:

said signal-bearing media further comprises transmission media.

* * * * *